Oct. 30, 1923.
W. H. MELLOR ET AL
1,472,224
MACHINE FOR CUTTING CHEESE AND OTHER SUBSTANCES
Filed Sept. 15, 1922
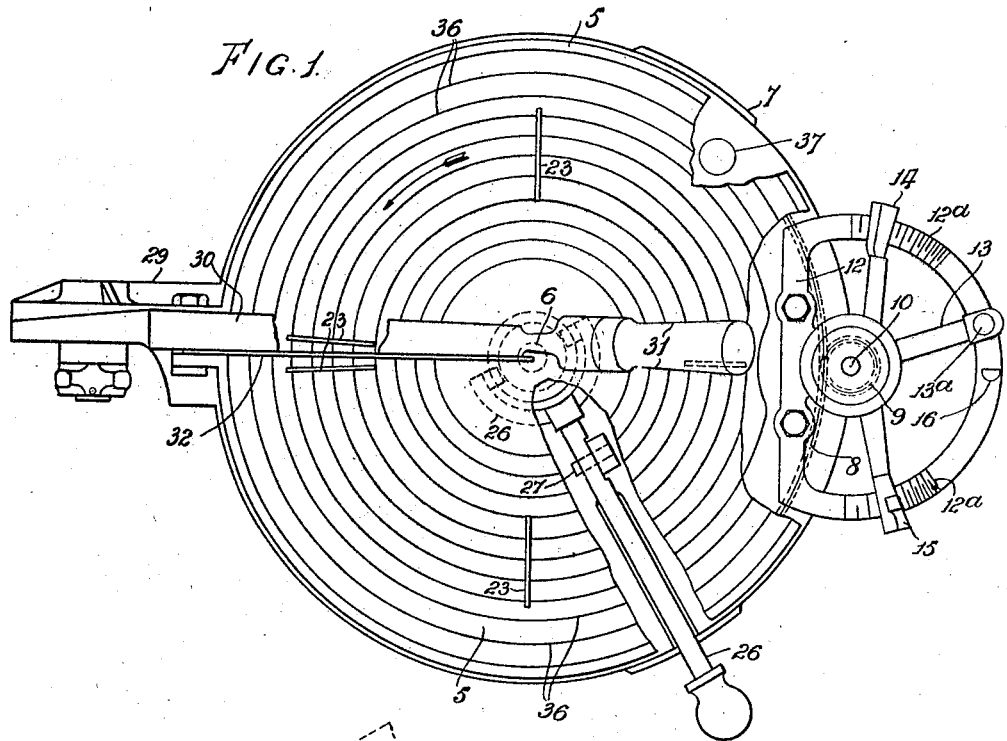
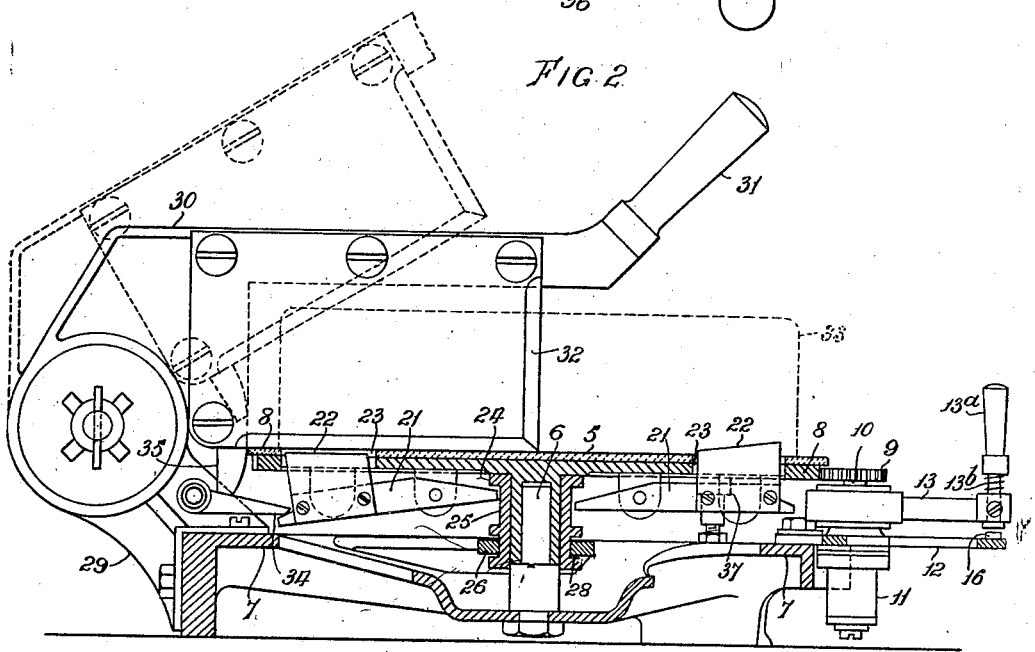
Inventors: William H. Mellor
and
Leonard Mellor
By Stonebridge & Borst, Attys Patented Oct. 30, 1923.

1,472,224

UNITED STATES PATENT OFFICE.

WILLIAM HENRY MELLOR AND LEONARD MELLOR, OF MANCHESTER, ENGLAND.

MACHINE FOR CUTTING CHEESE AND OTHER SUBSTANCES.

Application filed September 15, 1922. Serial No. 588,440.

*To all whom it may concern:*

Be it known that we, WILLIAM HENRY MELLOR and LEONARD MELLOR, subjects of the King of Great Britain and Ireland, and residents of Manchester, in the county of Lancaster, England, have invented certain new and useful Improvements in or Relating to Machines for Cutting Cheese and other Substances, of which the following is a specification.

This invention has reference to machines for cutting cheese and other substances, of the kind comprising a rotary table on which is mounted a circular slab of the cheese or other substance and which is adapted to be rotated to a predetermined extent relatively to a knife or fixed point for the cutting off from the slab of a corresponding sector. The object of the invention is to provide improved means of securing the slab of cheese or other substance upon the rotary table.

According to this invention, the slab of cheese or other substance is secured upon the table by means of knife-like devices normally lying below the level of the table and adapted to be projected into the slab and to recede out of the way as portions of the slab are cut off, and removed.

In the accompanying drawings, Fig. 1 is a plan, partly broken away, and Fig. 2 a section illustrating one embodiment of our improved securing means in a cheese cutting machine.

Referring to the drawings, the machine illustrated comprises a horizontal rotary table 5 mounted on a central fixed pivot 6 in a suitable frame 7 and provided on its underside with a circular rack 8 with which gears a pinion 9 carried by a shaft 10 which is mounted in a bearing 11 carried by brackets 12 secured to the frame 7. The pinion shaft 10 is provided with an operating lever 13 adapted to rotate the shaft in one direction through the medium of a one-way clutch of the ball or any other appropriate type. The lever 13 operates between adjustable stops 14, 15 and a fixed stop 16 carried by a suitably calibrated scale 12$^a$ forming part of the bracket 12, operation of the lever in one direction resulting in the rotation of the table to an extent depending upon the position of the adjustable stops, relatively to each other or the fixed stop 16, and the return movement of the lever having no effect on the table.

Pivotally mounted on the underside of the table 5 so as to rock vertically is a plurality of levers 21 disposed radially at equal angular spacing. The levers 21 are so pivoted that knife-like blades 22 carried at their outer ends normally lie in a retracted position below the table, but are, on the depression of the inner ends of the levers, projected through holes 23 in the table into the cheese or slab centred thereon. The inner ends of the levers 21 engage below a flange 24 at the upper end of the sleeve 25 slidably mounted on the pivot of the table and normally held raised. The sleeve 25 is adapted to be depressed by the raising of the outer end of the lever 26 which is pivoted at 27 and the inner bifurcated end of which engages in an annular groove 28 in the sleeve. When so depressed, the sleeve rocks the radial levers 21 to project their knife-like blades 22 through the holes 23 in the table and into the cheese thereon to hold same in the centered position, as shown at the right hand side of Fig. 2. On the release of the operating lever 26, the same and the sleeve 25 are returned by gravity to initial position, leaving the radial levers in the rocked position.

Mounted on the outside of the frame 7 is a bracket 29 in which is pivoted a knife holder 30 provided with a suitable operating handle 31, the centre of the pivot being in line with the upper surface of the rotary table. The knife blade 32 fixed in the holder is of rectangular shape, and its lower and inner edges extend to but not beyond the centre of the table so that it cuts to but not beyond the centre of the cheese or slab thereon.

In operation, the cheese or slab of cheese (indicated in dotted lines at 33 in Fig. 2) is weighed and is then centred on the rotary table and secured in position thereon by projecting the knife-like blades 22 of the radial rocking levers 21, into it from below, as above described. The adjustable stops 14, 15 are then set at such a position that each operation of the lever 13 will impart to the table 5 an angular movement of an amount which is the same subdivision of a complete revolution as the weight to be cut is of the total weight. If, for example, the weight of the cheese or slab of cheese is 15 lbs. and it is desired to cut sectors of ¼ lb. the adjustable stops will be set so that each operation of the lever rotates the table one sixteenth of a revolution or 6°. This being done, a first radial cut is made by the knife which is then moved clear to allow the table to be rotated one step, when on another cut being made a sector weighing ¼ lb. will be cut off. Each further step of rotation of the table will provide a sector weighing ¼ lb. to be cut off by the knife, and sectors weighing any multiple of ¼ lb. may be obtained by rotating the table a corresponding number of steps before severing.

As the cheese is cut away and the cut portions are removed, the knife-like blades 22 fall back into the retracted position. If during the cutting of a sector the cutting knife should come into contact with a blade 22, the latter will be depressed by the former into the retracted position. Preferably, however, we adapt the outer end of the rocking levers 21 to be depressed to retract their blades 22 when they are in the immediate vicinity of the line of cutting. This we conveniently effect by means of an arm 34 (Fig. 2) pivoted on the bracket 29 and normally held raised by a spring so that its free end is above the level of the raised outer ends of the levers 21, and adapted to be depressed by a projection 35 on the knife holder 30 at each operation thereof, and to engage and depress the outer end of any of the levers 21 which may happen to be in its path.

We preferably provide at one point two rocking levers with blades 22 arranged close together, as indicated by the pair of holes 23 at the left hand side of Fig. 1, and make the first cut close to such blades but at the rear side thereof relatively to the direction of rotation of the table 5, so that the last portion of the cheese will be held by the pair of blades 22 which will afford a better hold than a single blade.

For facilitating the centring of the cheese or slab of cheese upon the table 5 the latter may, as hitherto, be marked with a number of concentric circles 36.

The handle 13ª of the table operating lever 13 may be mounted to slide in the end of the lever and to be held raised by a spring 13ª against the action of which it can be depressed so that its lower end engages the fixed stop 16 to arrest the lever midway between the adjustable stops 14, 15 and enable the cutting of portions of one-half of the weight represented by a full operation of the lever.

For supporting the table 5 to prevent any tilting thereof we provide on the frame 7 a series of adjustable posts 37 over the tops of which the rack 8 slides.

What we claim is:—

1. A machine for cutting cheese and other substances, comprising a table, means for securing the slab of cheese or other substance upon the table of the machine, a plurality of rockable levers pivotally mounted on the under side of the table, blades carried by the levers normally below the level of the table, and common means for rocking all of said levers simultaneously to project the blades into the slab upon the table and to permit the blades individually to be lowered below the table.

2. A cutting machine comprising a moving table for supporting the substance to be cut, a plurality of levers pivotally carried by the underside of the table and provided with portions adapted to pass above the table and engage with the substance, and a slidable sleeve engaging with the levers for operating them in a direction to engage with the substance, said sleeve and levers having a lost motion connection for permitting a return movement of the sleeve without operating the levers and for permitting individual return of the levers.

3. A cutting machine comprising a moving table for supporting the substance to be cut, a plurality of levers pivotally carried by the underside of the table and provided with portions adapted to pass above the table and engage with the substance, a slidable sleeve engaging with the levers for operating them in a direction to engage with the substance, said sleeve and levers having a lost motion connection for permitting a return movement of the sleeve without operating the levers and for permitting individual return of the levers, and a hand lever for operating the sleeve.

4. In a cutting machine, a table for supporting the substance to be cut, means carried by the underside of the table and operable through the table into engagement with the substance to hold it to the table, a sleeve mounted for axial movement below the table and connected to the means to operate the same into engagement with the substance during all rotative positions of the table, and means for shifting the sleeve to operate the means through the table into the substance.

5. In a cutting machine, a frame, a table movable relatively to the frame and supporting the substance to be cut, anchoring devices carried by the table and shiftable into the substance, a cutting knife mounted on the frame and adapted to cut the substance after increments of relative movement between the frame and table, and means operatable concomitantly with the knife for retracting any of the anchoring devices within the path of the approaching knife.

6. In a cutting machine, a frame having a vertical spindle, a table rotatably carried by the spindle for supporting and rotating an article to be cut, levers pivotally carried by the under side of the table for movement in a plane transverse to the table, said levers carrying anchoring members which pass through and above the table into the article when the levers are operated in one direction, a sleeve disposed around the spindle and slidable toward and from the table, said sleeve engaging the levers with a lost motion connection whereby when the sleeve is given a sliding movement in one direction it will operate all of the levers to project the anchoring members into the article and when returned it will permit the individual return of the levers, and means for sliding the sleeve in both directions.

7. In a cutting machine, a frame having a vertical spindle, a table rotatably carried by the spindle for supporting and rotating an article to be cut, levers pivotally carried by the under side of the table for movement in a plane transverse to the table, said levers carrying anchoring members which pass through and above the table into the article when the levers are operated in one direction, a sleeve disposed around the spindle and slidable toward and from the table, said sleeve engaging the levers with a lost motion connection whereby when the sleeve is given a sliding movement in one direction it will operate all of the levers to project the anchoring members into the article and when returned it will permit the individual return of the levers, a knife carried by the frame for cutting movements in the article carried by the table, and means for positively withdrawing during a cutting movement any anchoring member which has been brought within the path of the knife, and means for sliding the sleeve in both directions.

8. In a cutting machine, a frame having a vertical spindle, a table rotatably carried by the spindle for supporting and rotating an article to be cut, levers pivotally carried by the under side of the table for movement in a plane transverse to the table, said levers carrying anchoring members which pass through and above the table into the article when the levers are operated in one direction, a sleeve disposed around the spindle and slidable toward and from the table, said sleeve engaging the levers with a lost motion connection whereby when the sleeve is given a sliding movement in one direction it will operate all of the levers to project the anchoring members into the article and when returned it will permit the individual return of the levers, means for sliding the sleeve in both directions, and a device for imparting variable and successive increments of rotation to the table.

9. In a cutting machine, a frame and a table having relative movement, anchoring devices normally below the table and projectable above the table to engage with and anchor to the table an article to be cut, a cutting knife carried by the frame and adapted to cut the article between different increments of relative movement of the table and frame, and means operable by the knife during a cutting movement for retracting below the table any anchoring device which has been brought into the path of the knife.

10. In a cutting machine, a frame and a table having relative movement, anchoring devices normally below the table and projectable above the table to engage with and anchor to the table an article to be cut, a cutting knife carried by the frame and adapted to cut the article between different increments of relative movement of the table and frame, and a device for producing variable and successive increments of relative movement between the frame and table.

In witness whereof we have hereunto set our hands.

WILLIAM HENRY MELLOR.
LEONARD MELLOR.